United States Patent Office 3,496,982
Patented Feb. 24, 1970

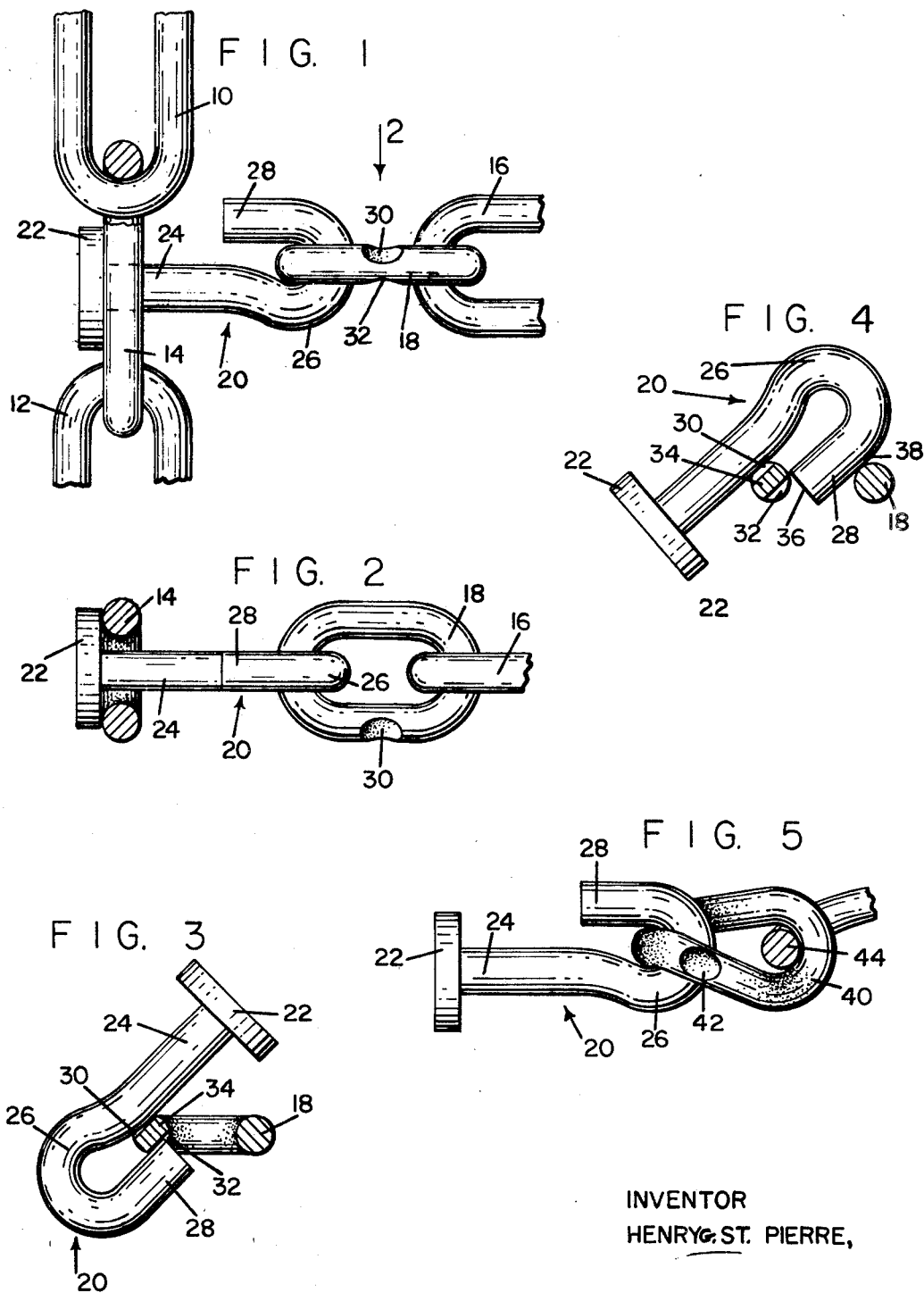

3,496,982
QUICK ATTACHABLE CROSS CHAIN AND
SWIVEL HOOK FOR TIRE CHAINS
Henry G. St. Pierre, 50 Frank St.,
Worcester, Mass. 01604
Filed Mar. 4, 1968, Ser. No. 710,209
Int. Cl. B60c 27/06
U.S. Cl. 152—241                                    7 Claims

ABSTRACT OF THE DISCLOSURE

A cross chain for tire chains in which the end links are provided with nicks or notches for the easy reception of a swivel hook in one position only, the swivel hook being connected to the chain side wall and the nick or notch having a general axis across a run of its length and at an incline with respect to the general plane thereof.

BACKGROUND OF THE INVENTION

This invention is an improvement over U.S. Patent 3,044,521 dated July 17, 1962 in respect to the positioning of the nick or notch, or restrictive portions 20 and 22 shown in the above patent while at the same time utilizing a more conventional swivel hook rather than the one shown in FIG. 1 of that patent, it having been discovered that the ridge at 30 can be completely done away with, as also can the flattened hook nose.

The above noted patent initiated a wide-reaching change in tire chains because the entire chain can be quite easily assembled by hand by anyone without the use of tools and cross chains when worn out can be quickly and easily changed right on the wheel also without tools by thrusting the nose of the respective swivel hook through the corresponding end link of the cross chain at the restricted portion, this being the only place that the swivel hook is acceptable.

Furthermore, the side walls, the cross chains, and the hooks can be assembled at the factory, placed in a bag and delivered without too great an expectation of the nose of the swivel hook happening to coincide with the restricted areas 20 and 22 and thus becoming disengaged.

However it does happen that some of the cross chains do become thus disengaged in transit and when this happens the swivel hook is then free to become also disengaged from the side wall.

The present invention reduces this accidental disengagement by one-half and more, it being pointed out that the swivel hook of the prior art can be engaged with the end link of the cross chain in either one of two different positions; whereas in the present case, it can be engaged and therefore disengaged in only one relative position.

SUMMARY OF THE INVENTION

The invention in the present case comprises a chain which includes a swivel hook having a detachable connection with respect to the end link of a cross chain and a head which secures it with respect to the side wall, the swivel hook being a plain hook with the aforesaid head on a rod-like shank having a bight for engagement with the restricted area, notch or niche which in the present case forms a guide for the nose of the hook, this guide having an axis which is not in the plane of the link nor is it at right angles with respect to the plane of the link but at an intermediate angle with respect thereto, this providing that the swivel hook and the chain can be assembled in one position only of the two parts respectively; whereas in the prior art this could be done in two different positions.

BRIEF DESCRIPTION OF THE DRAWINGS

FIG. 1 is a view in elevation illustrating the invention;
FIG. 2 is a view partly in section looking in the direction of arrow 2 in FIG. 1;
FIG. 3 is a view illustrating the only relationship between the swivel hook and the notched link which allows the parts to become attached or detached;
FIG. 4 is a view similar to FIG. 3 showing that the FIG. 3 position is the only one possible to engage and disengage the parts, and
FIG. 5 shows the invention applied to a twist link.

DESCRIPTION OF A PREFERRED EMBODIMENT OF THE INVENTION

Referring now to FIGS. 1 and 2, a portion of the side wall of a tire chain is illustrated at 10, 12 and 14, these links being plain straight links as usual. A link 16 is the next to the end link in the cross chain, the end link being shown at 18.

The swivel hook is generally indicated by the reference numeral 20 and it has an end head 22 which holds it assembled with respect to link 14 of the side wall. This head is mounted on a shank 24 which extends through link 14 and it has a revrese turn or bight 26 together with a relatively long nose 28. As shown in FIG. 2, the nose 28 is in the plane with bight and is substantially equally thereto in diameter and shape, being circular in cross section, the shank, bight, and nose all being in effect parts of a rod.

The end link 18 of the cross chain is provided with a restricted area or passage provided by a pair of opposed notches indicated at 30 and 32, these notches preferably being rounded more or less in conformance with the section of the nose 28 and shank 24 of the swivel hook 20. The restricted areas 30 and 32 are generally complementary and provide between them a relatively narrow web 34 which has a thickness to just slidingly receive the area between the nose 28 and shank 20 as clearly illustrated in FIG. 3.

In FIG. 3 the swivel hook can be moved to disengage from the link 18 or it can be moved to fully engage therewith as shown in FIG. 1. However this is the only relative position in which this operation is possible as is illustrated in FIG. 4 wherein the link 18 is shown the same as in FIG. 3 but the swivel hook has been reversed in order to try to enter it from the opposite direction. This is clearly impossible to do because the extreme end at 36 of the nose 28 of the swivel hook impinges on the web 34 as clearly shown in FIG. 4 in the best possible position of attempted engagement of the parts in this manner; whereas the base part of the nose of the hook which is indicated at 38 comes to rest on the inside aspect of the opposite run of the link 18 from the position of the restricted areas 30 and 32.

This being the case, and it being only possible to engage the parts as shown in FIG. 3, this is also the only possible way in which the parts can be disengaged. Since in the prior art the best condition is one in which the part can become disengaged in two different conditions, it will be seen that the danger of accidental disengagement of these parts in storage or transit has been reduced to one-half; and as a matter of fact actual experience has shown that it is reduced even further, probably because of the fact of the relative construction of the swivel hook and the slanted restricted areas 30 and 32. That is, the condition shown in FIG. 3 is not so apt to be encountered in transit or storage of the parts as is the condition where the parts can become detached as shown in FIG. 1 in the aforementioned U.S. Patent 3,044,521.

The link at 18 has been shown as a plain link and in many cases it is preferred that the cross chain shall be made in this manner because it is then more apt to roll on the tire, thus presenting all surfaces thereof for longer wear, making the cross chain last longer, since the swivel hook 24 can easily turn on the axis of shaft 24 relative to link 14.

However simply by twisting the links 18 in the normal manner of a twisted link of a cross chain, the same invention applies exactly as well to a twisted link cross chain and this twist is performed in exactly the ordinary way after the link 18 shown in the present case has been made. Such a twist link then looks as illustrated in FIG. 5, at 40, one part of the restricted area being shown at 42, and the next twist link at 44.

Having thus described my invention and the advantages thereof, I do not wish to be limited to the details herein disclosed, otherwise than as set forth in the claims, but what I claim is:

1. The combination of a hook for connecting the side wall chain and cross chain of tire chains wherein said hook comprises a shank having means at one end for connection to a link of the side wall chain and a bight at the other end, said bight extending from the shank into an elongated terminal nose portion approaching said shank portion, there being a space between the nose portion of the hook and the shank,
    with the end link of a cross chain, said end link including a pair of side runs one of which has a restricted portion generally complementary to the opening between the shank and the nose portion of the hook, for assembly and disassembly of the hook and end link, wherein the restricted portion is located at an incline with respect to a plane at right angles to the general plane of the end link of the cross chain, so that the nose portion of the swivel hook is enterable into said link in one position only with respect thereto.

2. The combination of claim 1 wherein the end link of said cross chain is twisted.

3. The combination of claim 1 wherein the restricted portion comprises a web less in thickness than the diameter of the material of the link.

4. The combination of claim 1 wherein said restricted portion comprises a pair of opposed notches, one at each side of the run of the end link of the cross chain.

5. The combination of chain 1 wherein said restricted portion comprises a pair of opposed generally concave notches, one at each side of the run of the end link of the cross chain.

6. The combination of claim 1 wherein said restricted portion comprises a pair of opposed generally concave notches, one at each side of the run of the end link of the cross chain, the adjacent surfaces of the shank and nose portion of the hook being generally convex.

7. The combination of claim 1 wherein the means to connect the hook to the side wall link includes a head on the hook shank, the latter extending generally loosely through the side wall link.

References Cited

UNITED STATES PATENTS 3,044,521   7/1962   St. Pierre _____ 152—241
3,280,438   10/1966   Luketa _____ 24—201

ARTHUR L. LA POINT, Primary Examiner

U.S. Cl. X.R.

24—201